United States Patent [19]

Knittel et al.

[11] Patent Number: 4,844,741
[45] Date of Patent: Jul. 4, 1989

[54] THERMOSTABLE RUTILE MIXED PHASE PIGMENTS

[75] Inventors: Helmut Knittel, Ludwigsburg; Roland Bauer, Bergisch-Gladbach; Egon Liedek, Esslingen; Guenter Etzrodt, Stuttgart, all of Fed. Rep. of Germany

[73] Assignee: Lacke & Farben Aktiengesellschaft, Muenster, Fed. Rep. of Germany

[21] Appl. No.: 185,311

[22] Filed: Apr. 20, 1988

Related U.S. Application Data

[63] Continuation of Ser. No. 013,880, Feb. 12, 1987, abandoned.

[30] Foreign Application Priority Data

Feb. 13, 1986 [DE] Fed. Rep. of Germany ....... 3604317

[51] Int. Cl.$^4$ ................................................. C09C 1/36
[52] U.S. Cl. ..................................... 106/436; 106/453; 106/455
[58] Field of Search ........................ 106/436, 453, 455

[56] References Cited

U.S. PATENT DOCUMENTS

| | | | |
|---|---|---|---|
| 3,832,205 | 8/1974 | Lowery | 106/302 |
| 3,884,871 | 5/1975 | Herman et al. | 427/221 |
| 4,036,662 | 7/1977 | Rademacher et al. | 106/300 |
| 4,156,613 | 5/1979 | Hünd et al. | 106/302 |
| 4,183,768 | 1/1980 | Knapp et al. | 106/300 |
| 4,222,789 | 9/1980 | Jacobson | 106/300 |
| 4,390,374 | 6/1983 | Balducci et al. | 106/300 |
| 4,624,710 | 11/1986 | Moldy | 106/302 |

FOREIGN PATENT DOCUMENTS 1198085 12/1985 U.S.S.R. .
877734 9/1961 United Kingdom .

OTHER PUBLICATIONS

Chemical Abstracts, vol. 92, 112362a, (1980) Apr., No. 14, p. 77, European Search Report.
Chemical Abstracts, vol. 104, No. 22, 188,267k (Jun. 1988).

Primary Examiner—Paul Lieberman
Assistant Examiner—Willie J. Thompson
Attorney, Agent, or Firm—Keil & Weinkauf

[57] ABSTRACT

Thermostable rutile mixed phase pigments of the ternary system titanium, antimony and chromium contain from 0.1 to 2.0% by weight of magnesium.

2 Claims, No Drawings

THERMOSTABLE RUTILE MIXED PHASE PIGMENTS

This application is a continuation of application Ser. No. 013,880, filed on Feb. 12, 1987 aband.

Of the rutile mixed phase pigments, the nickel and chromium versions have become widely established in industry. If chromium oxide is incorporated as a coloring oxide in the rutile lattice, relatively highly valent metal oxides, particularly of antimony ($Sb_2O_5$), are incorporated as well to balance the charge (cf. Ullmann's Encyclopädie der technischen Chemie, 4th edition, volume 18, pages 606–610).

These rutile mixed phase pigments which, in addition to $TiO_2$, contain chromium(III) oxide and antimony(V) oxide, can be prepared in any shade from pale golden yellow to dark brownish yellow by varying the individual components in the ternary system Ti-Cr-Sb. They are highly resistant to acids, alkalis, UV radiation and weathering. The favorable toxicological properties are a further reason why this group of pigments is more and more widely used in the plastics and paint industry and in some instances is used as a replacement for the yellow cadmium or lead colors which are classified as toxic.

However, these rutile mixed phase pigments have the disadvantage of increasingly discoloring at temperatures above 240° C., which occur in some instances in the processing of plastics, and at temperatures of from 280° C. to 300° C. leading to off-shade colors (gray or grayish green), so that they cannot be used in a wide application area.

It is an object of the present invention to provide rutile mixed phase pigments of the ternary system titanium, antimony and chromium which are thermostable even at above 240° C. and at the same time have the otherwise excellent pigment properties of rutile mixed phase pigments.

We have found that this object is achieved when rutile mixed phase pigments contain from 0.1 to 2.0% by weight of magnesium. In addition to magnesium, which is generally present in the form of magnesium oxide or as magnesium silicate, the rutile mixed phase pigments according to the invention contain from 75 to 85% by weight of $TiO_2$, from 4 to 9% by weight of $Cr_2O_3$ and from 10 to 16% by weight of $Sb_2O_5$.

The pigments according to the invention are prepared in a conventional manner by dry or wet mixing. In the dry process, the individual oxide components are intimately mixed with one another and the mixtures are reacted with one another at 900°–1,200° C. In place of oxidic compounds it is also possible to use compounds which, at the baking temperatures mentioned, are converted in the presence or absence of an oxidizing atmosphere into the corresponding oxides, for example carbonates and nitrates. The magnesium component used can be magnesium oxide, although it is preferable to use magnesium carbonate, which has a particularly favorable effect on the pigment properties of the end product. The magnesium carbonate used advantageously has a BET specific surface area of from 25 to 50 $m^2/g$.

The antimony component used is expediently antimony trioxide which expediently has a BET specific surface area of from 1 to 5 $m^2/g$ and which, in the course of the subsequent bake in an oxidizing atmosphere, is converted into pentavalent antimony oxide. The chromium trioxide used expediently has a BET surface area of from 3 to 6 $m^2/g$.

The titanium oxide component used is advantageously anatase, which is more reactive.

Instead of the dry mixing process it is also possible to use the wet mixing process, wherein the oxidic constituents are mixed in aqueous suspension to obtain particularly efficient mixing. If the starting material used is a suspension of titanium oxide hydrate in sulfuric acid, it is necessary to use acid-insoluble magnesium compounds. It is advantageous to use magnesium silicate, insoluble in this medium, which expediently has a BET specific surface area of from 5 to 15 $m^2/g$.

After the bake the products obtained are worked up in a conventional manner by dry and/or wet milling.

The thermostability is tested in plastics, for example is a 1–2% strength pigment concentration in nylon or ABS. Colored plastic platelets are prepared and heated for 5 minutes at 240° C., 260° C., 280° C., 300° C. and 320° C., respectively, in a laboratory oven. The plastic platelets thus treated are then visually compared or colorimetrically measured against the 240° C. sample. For a pigment to be classified as thermostable, no visible color difference may appear between the 240° C. sample and the 320° C. sample.

In the examples, the parts are by weight.

EXAMPLE 1

79 parts of anatase are thoroughly mixed with 14 parts of antimony trioxide, 6 parts of finely divided chromium trioxide and 2 parts of magnesium carbonate.

The mixture is then heated at about 1,070° C. in an electrically or gas-heated batch oven in an oxidizing atmosphere. This gives a relatively soft calcined product which is subsequently milled to form an aqueous pigment suspension. Thereafter the pigment suspension is dewatered, washed, dried and dry-milled.

About 100 parts are obtained of a dark yellow, strong and thermostable rutile mixed phase pigment having a pleasant, pure shade.

The product has the following composition:
$TiO_2$, about 79% by weight
$Cr_2O_3$, about 6% by weight
$Sb_2O_5$, about 14% by weight
MgO, about 1% by weight The same results are obtained by replacing anatase with 102 parts of titanium oxide hydrate having a $TiO_2$ content of 78% by weight. Test Result:

The pigment was tested in nylon in a 2% pigment concentration using temperature intervals of 20° C., the material being kept at each temperature for 5 minutes. The colorimetric evaluation in accordance with CIE-LAB was carried out on the injection molded platelets after cooling.

EXAMPLE 2

82 parts of anatase are thoroughly dry-mixed with 12 parts of antimony trioxide, 5 parts of finely divided chromium trioxide and 1.8 parts of magnesium carbonate. The mixture is then baked for up to 40 minutes at about 1,050° C. in a rotary tube furnace in which, to maintain the oxidizing atmosphere, $HNO_3$ is injected cocurrently. This gives a free-flowing, soft calcined product which is subsequently worked up as in Example 1.

About 100 parts are obtained of a pale yellow, tinctorially strong and thermostable rutile mixed phase pigment having an attractive, pure shade.

The product has the following composition:
$TiO_2$, about 82.0% by weight $Cr_2O_3$, about 5.1% by weight
$Sb_2O_5$, about 12.0% by weight
MgO, about 0.9% by weight The same results are obtained on replacing the anatase by 105 parts of titanium oxide hydrate having a $TiO_2$ content of 78% by weight.

EXAMPLE 3

A vessel which is equipped with a high-speed stirrer is charged with 400 liters of water and 852 kg of a titanium oxide hydrate suspension having a $TiO_2$ content of about 27% by weight and a pH of from 1.0 to 1.3 (sulfuric acid). 40 kg of antimony trioxide, 19 kg of chromium trioxide and 10 kg of magnesium silicate (microtalc) are then added to the titanium oxide hydrate suspension, and the mixture of raw material components is thoroughly stirred until homogeneous. The raw material suspension is then dewatered and dried. The dried mixture of raw materials is then heat-treated and worked up as in Example 2.

About 300 kg are obtained of a dark yellow, tinctorially strong and thermostable rutile mixed phase pigment having an attractive, pure shade.

The product has the following composition:
$TiO_2$, about 78% by weight
$Cr_2O_3$, about 7% by weight
$Sb_2O_5$, about 13.7% by weight
MgO, about 1.3% by weight

We claim:
1. A rutile mixed phase pigment thermostable at temperatures above 240° C. and consisting essentially of, by weight:
   (a) 75–85% TiO2,
   (b) 4–9% $Cr_2O_3$,
   (c) 10–16% $Sb_2O_5$, and
   (d) 0.1 to 2% Mg in the form of a magnesium oxide or a magnesium silicate.
2. A process for coloring plastics which are processed at temperatures above 240° C. which comprises: mixing said plastics with rutile mixed phase pigments wherein the rutile mixed phase pigments contain from 0.1 to 2% by weight of magnesium in the form of magnesium oxide and/or magnesium silicate and 10–16% $Sb_2O_5$.

* * * * *

UNITED STATES PATENT AND TRADEMARK OFFICE
CERTIFICATE OF CORRECTION

PATENT NO. : 4,844,741

DATED : July 4, 1989

INVENTOR(S) : Helmut KNITTEL, et al.

It is certified that error appears in the above-identified patent and that said Letters Patent is hereby corrected as shown below:

On the title page:

THE ASSIGNEE

The assignee should be correctly identified as:

"BASF Lacke & Farben Aktiengesellschaft,
Muenster, Federal Republic of Germany"

Signed and Sealed this

Fifth Day of June, 1990

Attest:

HARRY F. MANBECK, JR.

*Attesting Officer*     *Commissioner of Patents and Trademarks*